US006375275B1

United States Patent
Smith, Jr. et al.

(10) Patent No.: US 6,375,275 B1
(45) Date of Patent: Apr. 23, 2002

(54) RAILROAD BRAKE PIPE OVERCHARGE AND SEPARATION DETECTION SYSTEM

(75) Inventors: Eugene A. Smith, Jr., Satellite Beach; Milton C. Deno, Melbourne; Don K. Johnson, Palm Bay; Dale H. Delaruelle, Melbourne, all of FL (US); Carl Hines, Eudora, KS (US)

(73) Assignee: GE-Harris Railway Electronics, L.L.C., Melbourne, FL (US)

(*) Notice: Subject to any disclaimer, the term of this patent is extended or adjusted under 35 U.S.C. 154(b) by 0 days.

(21) Appl. No.: 09/475,821

(22) Filed: Dec. 30, 1999

Related U.S. Application Data
(60) Provisional application No. 60/125,757, filed on Mar. 23, 1999.

(51) Int. Cl.[7] ............................................. B60T 13/68
(52) U.S. Cl. ............................ 303/3; 303/15; 303/57; 303/63
(58) Field of Search ........................... 303/3, 15, 20, 303/57, 63

(56) References Cited

U.S. PATENT DOCUMENTS

| | | | |
|---|---|---|---|
| 3,799,623 A | * | 3/1974 | Wickham .................. 303/20 |
| 3,957,314 A | | 5/1976 | Falke |
| 4,859,000 A | | 8/1989 | Deno et al. |
| 5,056,873 A | | 10/1991 | Deno et al. |
| 5,638,276 A | | 6/1997 | Hart |
| 5,924,774 A | * | 7/1999 | Cook et al. .................. 303/3 |
| 6,126,245 A | * | 10/2000 | Barber et al. .................. 303/3 |

FOREIGN PATENT DOCUMENTS

WO        WO 99/38743 A1        8/1999

* cited by examiner

*Primary Examiner*—Matthew C. Graham
(74) *Attorney, Agent, or Firm*—Scott R. Hayden; Carl A. Rowold; Holland & Knight LLP (57) ABSTRACT

A brake pipe overcharge detection scheme determines when an overcharge situation occurs followed by an interruption of the brake pipe slow pressure reduction process of the brake system assimilation. When the slow pressure reduction process is interrupted, the rail cars may be left in an overcharged state (i.e., the car braking system is charged to a pressure greater than the normal brake pipe pressure). When the brake pipe pressure is set to its normal brake-release value, the pressure of the car braking systems will be greater than the brake pipe pressure. The car braking system will interpret this positive pressure differential as a request to set the car brakes, and will therefore partially apply the car brakes. As a result, additional drag forces will be encountered by the locomotive as it moves the train, which may result in train separations, and overheating of the car brake shoes and wheels may result in cracked wheels and derailments.

27 Claims, 3 Drawing Sheets

RAILROAD BRAKE PIPE OVERCHARGE AND SEPARATION DETECTION SYSTEM

This application claims the benefit of U.S. Provisional Application 60/125,757 filed Mar. 23, 1999.

FIELD OF THE INVENTION

The present invention relates generally to air brake systems for railroad trains and is particularly directed to detecting an overcharge or a separation in the brake pipe and automatically controlling the train locomotive until the condition is resolved.

BACKGROUND OF THE INVENTION

One of the most critical aspects of the operation of railroad vehicles, particularly freight trains, is the predictable and successful operation of the air brake system. The air brake system is subjected to a variety of dynamic effects, not only as a result of the controlled application and release of the brakes through changes in the brake pipe pressure, but also due to varying conditions encountered by the train.

Figure 1:
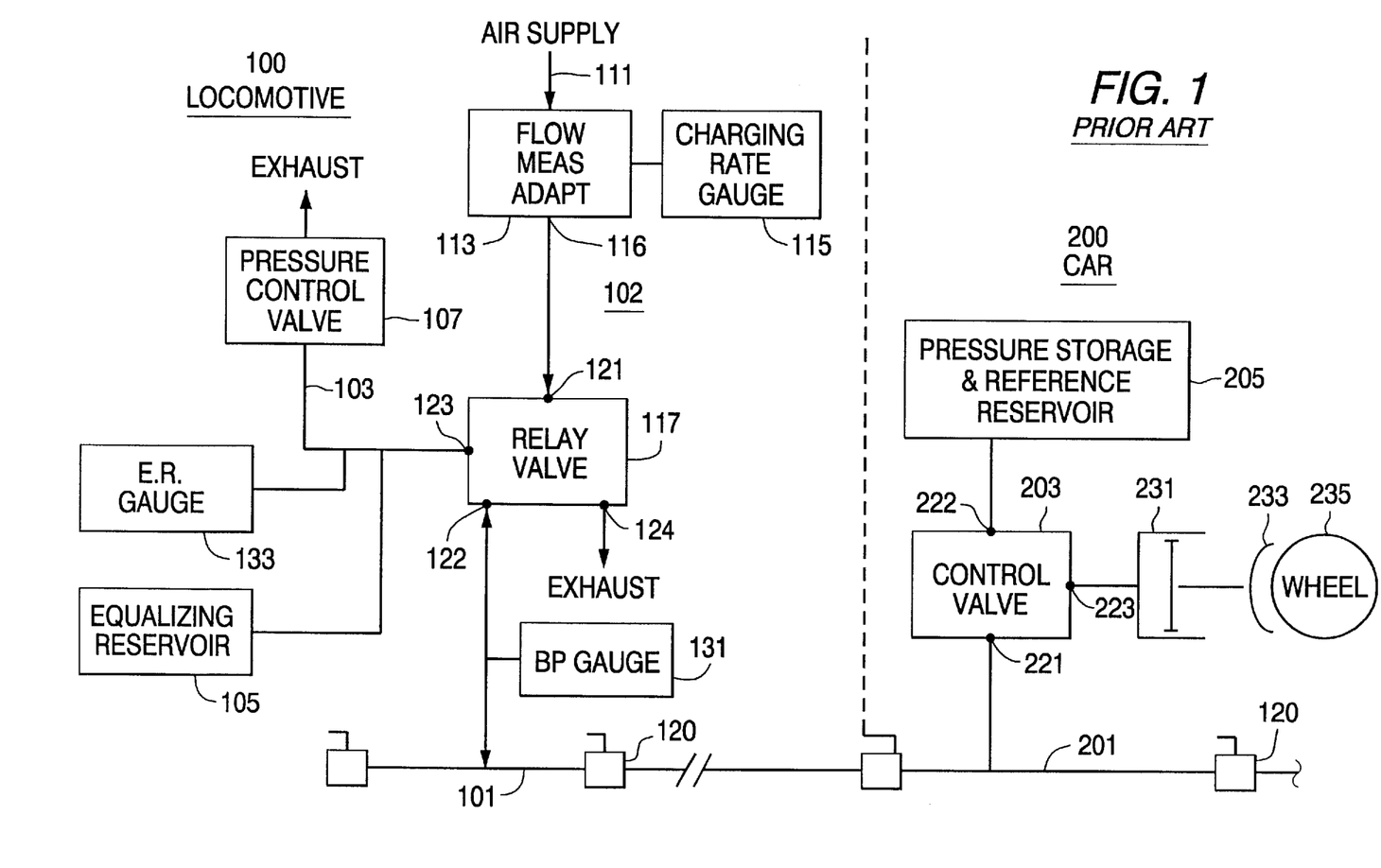
FIG. 1 is a block diagram illustrating a typical prior art air brake control system of a railway freight train.

FIG. 1 illustrates a typical prior art brake system employed by a railway freight train. The train brake system comprises a locomotive brake system located on a locomotive 100 and a set of car brake systems located on a set of railway cars illustrated by car 200. The application and release of braking action is generally controlled by an engineman within a locomotive 100. The locomotive 100 contains an air brake control system 102, including a controllably pressurized brake pipe 101. The pressurized brake pipe 101 is connected (via one of a series of cut-out valves 120) to the train air line 201. It is through the train air line 201 that air brake pressure is supplied to each of the cars 200 of the train. The brake control system 102 also includes an air supply input link 111 for supplying, under pressure, fluid (air) through which the brake pipe 101 and the train air line 201 are charged. Ultimately, the air brake control system 102 controls the operation of the pneumatically operated brake shoes 233 at each of the wheels 235 of the car 200.

A flow measuring adapter 113, and its associated charging rate gauge 115, are connected to the air supply link 111. The flow measuring adapter 113 and the charging rate gauge 115 measure and display the charging rate (as a differential pressure) of the brake control system 102. The output terminal 116 of the flow measuring adapter 113 is connected to input port 121 of a relay valve 117. A bi-directional port 122 of the relay valve 121 is coupled to the brake pipe 101. The relay valve 117 further includes a port 123 that is coupled through an air pressure control link 103 to an equalizing reservoir 105. The pressure control link 103 is also connected to a pressure control valve 107 through which the equalizing reservoir 105 is charged and discharged in the process of a brake operation. A port 124 of the relay valve 117 is controllably vented to the atmosphere as an exhaust port. Coupled with brake pipe 101 and air pressure control link 103 are respective pressure measuring and display devices 131 and 133. The brake pipe gauge 131 measures the air pressure in the brake pipe 101 and the equalizing reservoir gauge 133 measures the pressure in the equalizing reservoir.

The components of the car air brake control system 102, include a control valve 203, having a port 221 that is coupled to the train airline 201. Control valve 203 also includes a port 222 that is coupled to a pressure storage and reference reservoir 205. Finally, the control valve 203 includes a port 223 coupled to the air brake cylinder 231 that controls the movement of the brake shoe 233 against the wheels 235 of the car 200.

In operation, the cut out valve 120, through which brake pipe 101 and successive segments of the train air line 201 are coupled in serial fluid communication, is assumed to be fully open, so that there will be a continuous brake pipe/air line fluid path between the locomotive 100 and all of the cars 200 of the train. The brake system is initially pressurized by the operation of pressure control unit 107, which controls the air supply to line 103 so as to fully charge the equalizing reservoir 105. The relay valve 117 is then operated to couple port 121 with port 122 so that air is supplied there through to the brake pipe 101 and thereby to the train air line 201, to charge the brake pipe/air fluid line path 101/201 to the predetermined charging pressure. This pressure (typically 72 psi. on UIC trains) is established by the pressure of the equalizing reservoir 105 within the locomotive 100. The pressure within the brake pipe 101 and the train air line 201 is determined to have reached the correct pressure, as established by the pressure in the equalizing reservoir 105, when the pressure at port 122 (connected to the brake pipe 101) matches the pressure at port 123 (connected to the equalizing reservoir 105).

Through control valves 203 in each of the cars 200, the pressure storage and reference reservoirs 205 are filly charged, to thereby establish a reference pressure for maximum withdrawal of the piston of each air brake cylinder 231 and thereby complete release of the brakes 233 for each of the cars 200.

When the engineman desires to apply brakes to the wheels of the train cars 200, he operates pressure control unit 107, typically via a handle-operated control valve, which is coupled to the air pressure control link 103. Operation of the pressure control valve 107 causes a partial venting of air pressure control link 103 and thereby a reduction in the pressure within the equalizing reservoir 105. This reduction in pressure in the equalizing reservoir 105 is sensed by the relay valve 117 at port 123. In turn, this causes the bi-directional port 122 to be coupled to the exhaust port 124 and thereby exhaust the brake pipe 101 to the atmosphere, until the pressure within the brake pipe 101 equals the pressure of equalizing reservoir 105.

As the pressure in the brake pipe 101 and therefore within the train air line 201 drops, the control valves 203 in each of the cars 200 sense the pressure reduction in the train air line 201 by comparison to the pressure in the pressure storage and reference reservoir 205. This causes a corresponding increase in the pressure applied to the brake cylinders 231 from port 223, resulting in an application of the brake shoes 233 against the wheels 235 in proportion to the sensed pressure reduction in the train air line 201. Further pressure reductions in the equalizing reservoir 105 by the engineman produce corresponding pressure reductions in the train air line 201 and, thereby, additional braking effort by the brake shoes 233 in each of the cars 200. In summary, the intended operation of the brake system in the cars 200 and specifically the braking effort applied in each of the cars 200, is proportional to the reduction in pressure in the equalizing reservoir 105 within the locomotive 100.

When the engineman desires to release the train car brakes, he operates pressure control unit 107 to effectuate a recharging of the air brake control system 102. This is accomplished by bringing the pressure within the equalizing reservoir 105 back to its fully charged state as described above. With equalizing reservoir 105 recharged, there is again a pressure differential (but opposite in sign to the previous pressure drop in the pressure line 103) between the ports 122 and 123 of the relay valve 117. This increase in pressure is sensed by the control valves 203 in each of the cars 200 so as to cause the brake shoes 233 to be released by the action of the brake cylinder 231.

During normal operation, the application and release of the brakes is controlled in accordance with the above described sequence of events. However, there may be circumstances dictated either by action taken by the engineman or by other unpredictable events, which create the potential for unsafe operation of the braking system. One of these conditions relates to the standards and operation of the brake system on European trains having a UIC (Union Internationale de Chemins Fer) brake system.

UIC trains may have different operational pressures within the brake pipe 101. That is, there is not a standard brake pipe pressure for the operation of all UIC trains. As train cars are decoupled from one train and then combined to form a new train consist, the pressure storage and reference reservoirs 205 in each of the cars may be precharged to different levels, due to the different brake pipe pressures on the source trains. Uneven precharging among the cars 200 can cause uneven braking, sticking brakes, or possibly no braking on some of the cars when the engineman of the new train calls for brake application by reducing the brake pipe pressure. The engineman has no visual information as to the braking status, i.e., on or off at each car. He assumes that if the pressure in the brake pipe 101 is at a normal level (e.g., 72 psi) then the brakes of the cars are released, and if the brake pipe pressure is lower than normal, then the brakes are applied to some extent.

To overcome this problem, the UIC trains are required to undergo an assimilation process to neutralize this uneven pre-charge condition among the cars 200. The successful execution of the assimilation feature allows all cars 200 to be charged to the current brake pipe setting. This is accomplished by overcharging the brake pipe 101 (and thus the train line 201) to a level much higher than the normal operating brake pipe pressure and then slowly reducing the brake pipe pressure through the relay valve 117 and the exhaust port 124. Typically, the slow pressure reduction process takes one to two minutes. This pressure reduction occurs at a very slow rate (so that the brakes are not applied during bleed-down) and when it is completed, all cars 200 will have their pressure storage and reference reservoirs 205 equalized to the new pressure of the brake pipe 101 and the train air line 201.

If the assimilation feature is initiated so that the brake pipe 101 is overcharged and then there is an interruption in the assimilation process (e.g., a train emergency or the failure of the assimilation system) the brake equipment (specifically the pressure storage and reference reservoirs 205) in each of the cars 200 may be left in an overcharged state. For example, assume the assimilation feature is intended to raise the pressure in the brake pipe 101 and the air train line 201 to 83 psi to overcome the overcharged state in one or more of the cars 200. The assimilation feature is initiated and the pressure in the brake pipe/air train line 101/201 increases to 83 psi. The pressure is then reduced at a very slow controlled rate by an assimilation control valve. If the assimilation process is now interrupted by an emergency condition, for example, at a time when the pressure had been reduced to 80 psi, then the pressure storage and reference reservoirs 205 in each of the cars 200 will have a pressure of 80 psi, rather than the expected pressure of 72 psi.

After the emergency is over and the train is ready to return to normal operation, the engineman releases the brakes and the brake pipe pressure is set at its normal release setting of 72 psi. Since the cars 200 are charged to 80 psi, they sense a reduced pressure of 8 psi. Specifically, this reduction in pressure is sensed by the control valve 202, by comparison with the pressure in the pressure storage and reference reservoir 205. As a result, there is a brake application corresponding to an 8 psi brake pipe pressure reduction. The engineman will have no indication that the car brakes are applied, which can result in undesirable and possibly dangerous operating conditions. For example, additional motive effort will be required to move the train when the brakes are applied, and more fuel will be consumed. The brake application will cause the build up of heat in the brake shoes 233 and the wheels 235, possibly resulting in wheel tread damage, wheel cracks and train derailment. Also, since the train cars are dragging, the coupler forces will increase and could, in fact, exceed the coupler maximum force threshold and thereby cause separation of the train.

The situation is exacerbated when LOCOTROL® (a registered trademark of GE-Harris Railway Electronics, L.L.C.) control units are included in power trains that are operated with head-end and remote locomotives. In this case, a remotely-controlled locomotive could generate high pushing forces on cars ahead of it in the train, especially if these cars had the brakes set. As a result, the cars might be pushed off the track and derailed.

Another possible scenario proceeds as follows. Assume the assimilation pressure reduction process was interrupted when the brake pipe 101 and air train line 201 were charged to 79 psi, with a normal operating pressure is 72 psi. If the engineman wishes to apply the brakes, he does so through the pressure control valve 107 by exhausting the brake pipe line 101 to the atmosphere, via relay valve 117 and the pressure control link 103. The brake pipe pressure suddenly goes to 0 psi and the pressure in the train line 201 follows in due course. The control valve 203 senses the pressure differential between the train air line 201 and the pressure storage and reference reservoir 205, and applies the brakes. Continuing with this scenario, assume that the engineman now desires to release the brakes by increasing the pressure in the brake pipe line 101 to its normal value of 72 psi. But recall, that the reference storage and reference reservoir 205 has a pressure of 79 psi. This pressure differential of 7 psi will be sensed by the control valve 203, interpreted as a request for braking action, and the brakes will remain partially applied, even though the engineman has initiated a complete brake release.

Train separation is another emergency condition that must be detected and countered on UIC trains in a manner different than trains operating with North American type braking equipment. When a train separation occurs on a North American-type train, the pressure of the brake pipe 101 immediately goes to zero at the separation point and each car 200 detects this rapid drop in brake pipe pressure. Each car 200 then activates its emergency valve and in this way, the train separation emergency is quickly propagated through the adjacent cars. The emergency valve also causes application of the brakes 233 on each car 200. Emergency status is also propagated to the locomotive and when detected there, the charging of the brake pipe 101 through the relay valve 121 is suspended. Also, the locomotive throttle is commonly set to an idle position.

UIC train cars are not typically equipped with emergency valves and, therefore, cannot detect and propagate a train separation emergency. When a train separation occurs, the brake pipe 101 at the point of separation goes to zero pressure and the entire brake pipe must then exhaust through the separation break point. Depending upon the location of the separation, the time to completely exhaust the brake pipe 101 can be considerable, at least in relative terms. Since there is no propagation of the train separation emergency to the locomotive, the locomotive maintains its throttle position and continues to supply air to the brake pipe 101 until such time as the brake pipe 101 pressure drops below a predetermined cut off value. The time required for the locomotive brake pipe 101 to reach the cut off value could be considerable, and in some cases, it may never reach the cut off point.

The detection of train separations becomes much more significant when LOCOTROL® distributed power trains are operated, since an undetected train separation in front of the remotely controlled locomotives can result in these locomotives remaining in the powered state and, thus, create potentially dangerous in train forces near the separated cars.

SUMMARY OF THE INVENTION

In accordance with one aspect of the present invention, the above described shortcomings of the conventional UIC brake control systems using the assimilation feature are obviated by a new and improved brake control system. In one embodiment, the brake control system of the present invention monitors the brake pipe pressure at the locomotive to determine when it is in an overcharged state. If the slow reduction of the brake pipe pressure following the overcharged state is interrupted before reaching the normal brake pipe pressure, this occurrence is detected by the present invention. When the event that caused interruption of the assimilation process has ended, the brake control system reinitiates the assimilation process and recharges the brake pipe to the higher-value. Once recharged to the higher value, the slow pressure reduction process is initiated and when completed, the system has returned to its nominal pressure.

In another embodiment of the present invention, when interruption of the slow pressure reduction process is detected, the locomotive traction is automatically placed in to an idle state and the engineman alerted to the overcharged condition of the car pressure storage and reference reservoirs 205.

In yet another embodiment of the present invention, on UIC trains, a brake pipe separation is detected and the locomotive is automatically placed into an idle state. Detection is accomplished by monitoring the brake pipe pressure and airflow.

BRIEF DESCRIPTION OF THE DRAWINGS

The present invention can be more easily understood, and the further advantages and uses thereof more readily apparent, when considered in view of the description of the preferred embodiments and the following figures in which.

DETAILED DESCRIPTION OF THE PREFERRED EMBODIMENTS

Before describing in detail the particular railroad air brake overcharge and separation detection system in accordance with the present invention, it should be observed that the present invention resides primarily in a novel structural combination of conventional brake pipe parameter sensing circuits and computational components and not in the particular detailed configurations thereof. Accordingly, the structure, control and arrangement of these conventional components have been illustrated in the drawings by readily understandable block diagrams which show only those specific details that are pertinent to the present invention, so as not to obscure the disclosure with structural details that will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Figure 2:
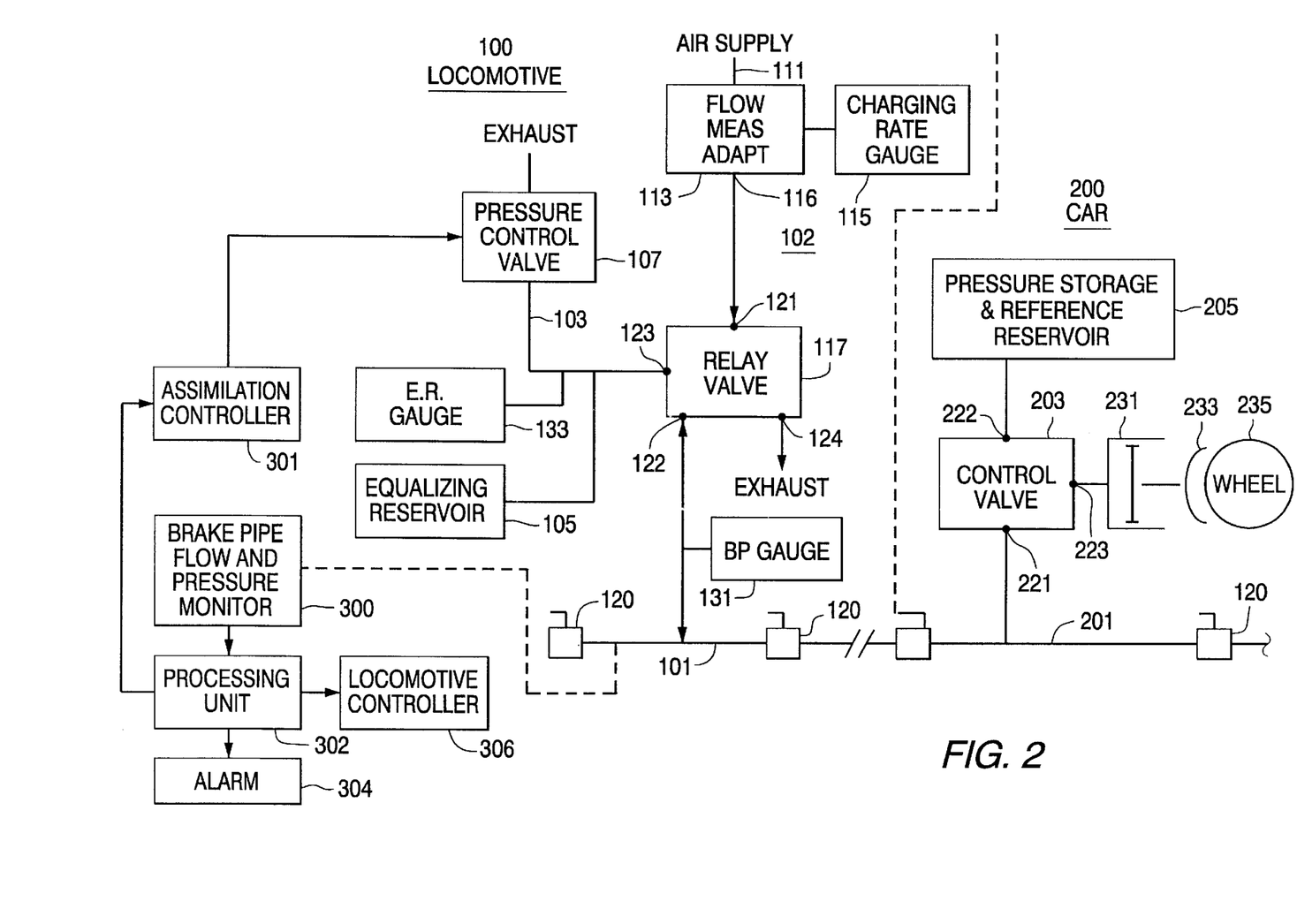
FIG. 2 is modification of the air brake control system of FIG. 1 incorporating the features of the present invention.

Referring to FIG. 2, there is shown the brake control system 102 of FIG. 1, including a brake pipe flow and pressure monitor 300 for sensing the pressure in the brake pipe 101. During normal assimilation operation, (under control of the assimilation controller 301) the brake control system 102 increases the pressure in the brake pipe 101 and the train line 201 to a predetermined assimilation pressure, which is higher than the normal pressure in the brake pipe/train air line 101/201. After the brake pipe/air train line 102/201 is charged to this higher pressure value, then the assimilation controller permits a controlled pressure reduction, at a predetermined rate, until the normal brake pipe pressure is reached. The brake pipe flow and pressure monitor 300 provides the brake pipe pressure to a processing unit 302.

Previously stored within the processing unit 302 are the predetermined assimilation pressure reduction rate and the predetermined assimilation overcharge pressure. Using these stored values, the processing unit 302 calculates the expected brake pipe pressures at various time points during the pressure reduction process. The expected pressure is compared to the actual pressure, as sensed by the brake pipe flow and pressure monitor 300, in the processing unit 302. In this way, when an interruption occurs in the assimilation pressure reduction process, the actual brake pipe pressure and the calculated value will differ. This difference indicates that there is a pressure overcharge condition in the cars, specifically in the pressure storage and reference reservoir 205 in each car 200. Upon the detection of this overcharge condition, the processing unit 302 will trigger an alarm 305. This alarm, for example, could be located in the cab of the locomotive 100. Once alerted, the engineman can take the appropriate action to ensure there is no train movement. In addition to alerting the engineman, the processing unit can also control the locomotive, by placing it in an idle state, for instance, until the car brake overcharge condition has been rectified. This embodiment is shown generally by a signal from the processing unit 302 to a locomotive controller 306.

In another embodiment, the processing unit 302 will determine whether the brake pipe 101 was in an overcharged state, based on the signal from the brake pipe flow and pressure monitor 300. The processing unit 302 will also determine whether there was an emergency during the pressure reduction process of the assimilation operation. For instance, an emergency brake application would be detected by the pressure in the brake pipe 101 going below a pressure threshold. This would be detected by the brake pipe flow and pressure monitor 300 and input to the processing unit 302. After recovery from the emergency, the pressure in the brake pipe 101 will be returned to normal by the engineman's control of the pressure control valve 107. This will also be detected by the brake pipe flow and pressure monitor 300 and the processing unit 302. Upon the detection of this event sequence (i.e., initiation of the assimilation operation, initiation of the slow pressure reduction process, interruption of the slow pressure reduction process, and return to a normal brake pipe pressure) the processing unit 302 will send appropriate signals to the alarm 304 and the locomotive controller 306 as previously discussed.

In yet another embodiment, the processing unit 302 can send a signal to the assimilation controller 301 that reinitiates the assimilation operation and in this way correct the over-pressurization state of the cars 200.

Figure 3:
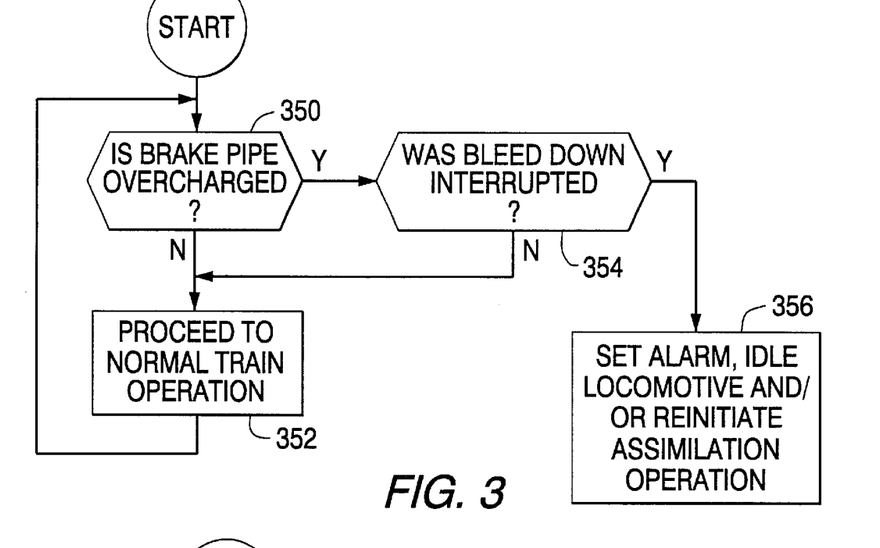
FIGS. 3 and 4 are flow charts illustrating operation of the brake control system of the present invention, as shown in FIG. 2.

The sequence of steps executed by processing unit 302 to implement the overcharge detection aspects of the present invention are illustrated in the process flow chart of FIG. 3. The process described by the flow chart is executed when the processing unit 302 is powered up and the sequence of steps is looped through during operation of the train. At decision step 350, the processing unit 302 determines whether the brake pipe is overcharged, based on the information provided by the brake pipe flow and pressure monitor 300. If the brake pipe is not overcharged, normal train operation proceeds as indicated at step 352 and the process loops back to the decision step 350. If the brake pipe was overcharged, processing continues to decision step 354 where the processing unit 302 determines whether the slow pressure reduction operation has been interrupted. As discussed in conjunction with FIG. 2, such an interruption may cause the car brake reference reservoir pressure to exceed the normal brake pressure. If the brake pipe slow pressure reduction process was not interrupted, indicating that the car brake reference reservoir pressure should be properly set, then processing continues to the step 352 where the train is operated normally. In the event the slow pressure reduction process was interrupted, processing continues to step 356 where an alarm may be set, the locomotive may be automatically placed in idle condition and/or the assimilation process is reinitiated.

There are several different techniques that can be employed to determine whether the slow pressure reduction process was interrupted. One method involves monitoring the brake pipe pressure to determine whether it decreases from the overcharged pressure to the normal brake line pressure. If the normal pressure value is never reached, then the slow pressure reduction process must have been interrupted. An alternative scheme calculates the rate of decrease in brake pipe pressure with time. This calculation is carried out in the processing unit 302 and is based on a stored value of the assimilation over-pressure and the slow pressure reduction rate. The actual brake pipe pressure is monitored and compared to the calculated value. If an interruption in the assimilation slow pressure reduction process occurs, then the actual brake pipe pressure will differ from the calculated brake pipe pressure.

Another embodiment of the present invention defines a train separation detection scheme for UIC brake-equipped trains. This embodiment will detect train separations, and in response thereto, automatically idle the locomotive throttle and suspend charging of the brake pipe. The brake pipe flow and pressure monitor 300 detects pressure of (as previously discussed) and air flow into the brake pipe 101. During normal operation, when the brake pipe 101 is being charged (that is, when the brakes are being released) the air flow into the brake pipe 101 will be high and the brake pipe pressure will be increasing. As the brake pipe pressure reaches its normal value, the air flow will decrease, until the brake pipe 101 reaches its maximum pressure and the air flow becomes minimal (that is, equal to the leakage in the air line 201).

When the engineman operates the pressure control valve 107 to apply the brakes, the brake pipe pressure drops, but the air flow will be relatively minimal since the brake pipe 101 is being exhausted through the relay valve 117 and the exhaust port 124.

When a train separation occurs, the brake pipe flow and pressure monitor 300 will detect an increased air flow to a relatively high value, while the brake pipe pressure begins to decline. When the brake pipe pressure drop exceeds a predetermined limit (for example, in one embodiment, more than 4.4 psi) during maximum air flow, then the processing unit 302 will interpret the sequence of events as indicating a train separation. A signal will be sent to the locomotive controller 306 from the processing unit 302 to set the locomotive traction to idle mode and suspend brake pipe charging. The locomotive emergency valve (not illustrated in the figures) will also be activated to quickly vent the locomotive brake pipe.

As the present invention is applied to LOCOTROL® distributed power trains, a train separation that occurs near one of the remote locomotives will cause a high air flow with a dropping brake pipe pressure. As discussed above, this condition will be detected very quickly by the processing unit 302 in response to signals from the brake pipe flow and pressure monitor 300. In response thereto, the locomotive will be placed in an idle state and the brake pipe charging suspended, as illustrated generally by the signal from the processing unit 302 to the locomotive controller 304. On the other hand, if a train separation is detected near the leading locomotive in a LOCOTROL® distributed power train, the detection of a train separation by the processing unit 302 can result in the sending of a signal to remote locomotives (again shown generically by the locomotive controller 306). The signal will cause the locomotive to be placed in an idle state, the suspension of brake pipe charging, and the application of the emergency brakes. The detection of train separations via the present invention not only enhances the predictable and successful operation of the air brake system, but also minimizes train stopping distances and end-train forces.

Figure 4:
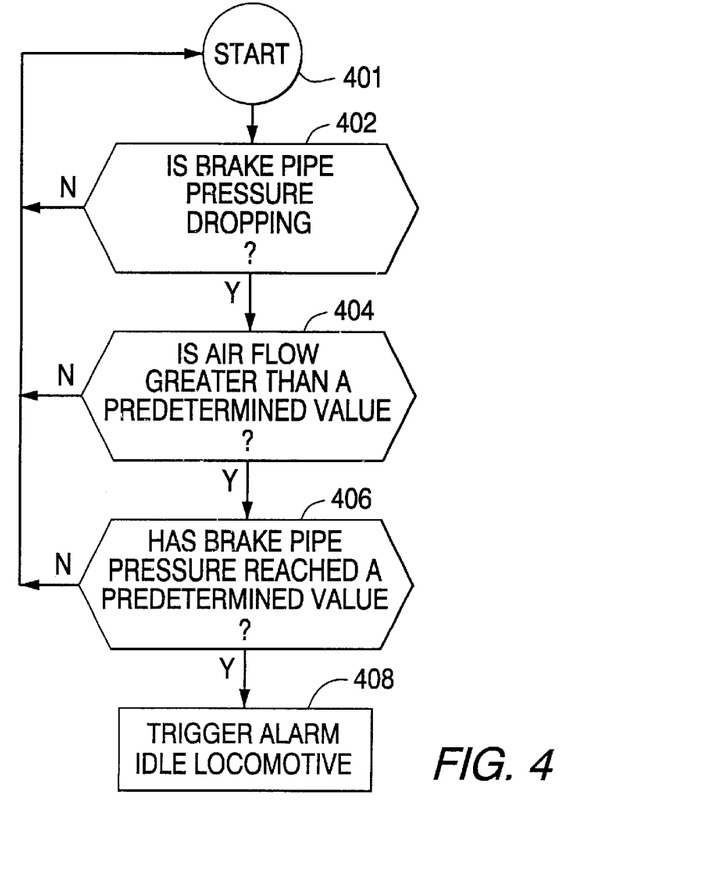

The sequence of steps executed by the processing unit 302 to implement the train separation detection aspects of the present invention are illustrated in the process flow chart of FIG. 4. The flow chart is executed when the processing unit 302 is powered up and the sequence of steps illustrated in FIG. 4 are looped through during operation of the train. At a decision step 402, the processing unit 302, in conjunction with the brake pipe flow and pressure monitor 300, determines whether the brake pipe pressure is dropping. Processing continues back to the start point 401 if the decision step answer is "no". If the brake pipe pressure is dropping, processing continues to decision step 404 where the processing unit 302 (again, in conjunction with the brake pipe flow and pressure monitor 300) determines whether the air flow has exceeded a predetermined value. In one embodiment, this value would be 7 psid. From decision step 404, processing either returns to the start step 401 or to decision step 406. At the decision step 406, the processing unit 302 determines whether the brake pipe pressure has reached a predetermined value. In one embodiment, this value is 72 psi. If the answer at decision step 406 is yes, a train separation is declared and at step 408 the locomotive is idled and/or an alarm is triggered.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. For use with an air brake system of a railway train having a locomotive and at least one car, the locomotive comprising a braking system controllably charged and discharged to release and apply brakes of the railway train cars, each car having a braking system in fluid communication with and controllably charged and discharged by the locomotive braking system, a method of determining whether an overcharged condition exists in the car braking system following an overcharge process whereby the locomotive braking system is charged to a predetermined overcharge pressure, comprising the steps of:

(a) monitoring the locomotive braking system pressure;
   (b) when the railway train is stopped, determining when the locomotive braking system pressure increases to the predetermined overcharge pressure, followed by initiation of a slow pressure reduction of the locomotive braking system; and
   (c) generating an output signal if the slow pressure reduction is interrupted and therefore does not result in the locomotive braking system pressure reaching a preselected value, such that the braking system of each railway train car is not charged to the same pressure.

2. For use with an air brake system of a railway train having a locomotive and at least one car, the locomotive comprising a braking system controllably charged and discharged to release and apply brakes of the railway train cars, each car having a braking system in fluid communication with and controllably charged and discharged by the locomotive braking system, a method of determining whether an overcharged condition exists in the car braking system following an overcharge process whereby the locomotive braking system is charged to a predetermined overcharge pressure, comprising the steps of:

(a) monitoring the locomotive braking system pressure;
   (b) determining when the locomotive braking system pressure increases to the predetermined overcharge pressure, followed by initiation of a slow pressure reduction of the locomotive braking system;
   (c) calculating the preselected value of the locomotive braking system pressure at intervals during the slow pressure reduction, based on a preselected rate for the slow pressure reduction; and
   (d) generating the output signal if during the slow pressure reduction of the locomotive braking system pressure is greater than the preselected value for longer than a predetermined time.

3. The method of claim 2 wherein the preselcted rate for the slow pressure reduction is determined by the overcharge pressure and the duration of the slow pressure reduction.

4. For use with an air brake system of a railway train having a locomotive and at least one car, the locomotive comprising a braking system controllably charged and discharged to release and apply brakes of the railway train cars, each car having a braking system in fluid communication with and controllably charged and discharged by the locomotive braking system, a method of determining whether an overcharged condition exists in the car braking system following an overcharge process whereby the locomotive braking system is charged to a predetermined overcharge pressure, comprising the steps of:

(a) monitoring the locomotive braking system pressure;
   (b) determining when the locomotive braking system pressure increases to the predetermined overcharge pressure, followed by initiation of a slow pressure reduction of the locomotive braking system; and
   (c) generating an alarm if the slow pressure reduction does not result in the locomotive braking system pressure reaching a preselected value.

5. For use with an air brake system of a railway train having a locomotive and at least one car, the locomotive comprising a braking system controllably charged and discharged to release and apply brakes of the railway train cars, each car having a braking system in fluid communication with and controllably charged and discharged by the locomotive braking system, a method of determining whether an overcharged condition exists in the car braking system following an overcharge process whereby the locomotive braking system is charged to a predetermined overcharge pressure, comprising the steps of:

(a) monitoring the locomotive braking system pressure;
   (b) determining when the locomotive braking system pressure increases to the predetermined overcharge pressure, followed by initiation of a slow pressure reduction of the locomotive braking system; and
   (c) placing the locomotive into an idle state if the slow pressure reduction does not result in the locomotive braking system pressure reaching a preselected value.

6. For use with an air brake system of a railway train having a locomotive and at least one car, the locomotive comprising a braking system controllably charged and discharged to release and apply brakes of the railway train cars, each car having a braking system in fluid communication with and controllably charged and discharged by the locomotive braking system, a method of determining whether an overcharged condition exists in the car braking system following an overcharge process whereby the locomotive braking system is charged to a predetermined overcharge pressure, comprising the steps of:

(a) monitoring the locomotive braking system pressure;
   (b) determining when the locomotive braking system pressure increases to the predetermined overcharge pressure, followed by initiation of a slow pressure reduction of the locomotive braking system; and
   (c) reinitiating the overcharge process if the slow pressure reduction does not result in the locomotive braking system pressure reaching a preselected value.

7. A control apparatus for use with a brake system of a railway train having a locomotive and at least one car, the locomotive comprising a braking system that is controllably charged and discharged to release and apply brakes of the railway train, each car includes a car braking system in fluid communication with and controllably charged and discharged by the locomotive braking system, an apparatus for determining whether an overcharged condition exists following an overcharge process whereby the pressurized braking system is charged to a predetermined overcharge pressure, wherein said control apparatus comprises:

means for monitoring the locomotive braking system pressure;
   means responsive to said monitoring means, when the railway train is stopped, for determining when the locomotive braking system pressure increases to the predetermined overcharge pressure, followed by the initiation of a slow pressure reduction of the locomotive braking system; and
   means for generating an output signal in response to said means for monitoring and said means for determining, if the slow pressure reduction is interrupted by an emergency condition and therefore does not result in the locomotive braking system pressure reaching a preselected value, and therefore the braking system of each railway train car is not charged to the same pressure.

8. A control apparatus for use with a brake system of a railway train having a locomotive and at least one car, the locomotive comprising a braking system that is controllably charged and discharged to release and apply brakes of the railway train, each car includes a car braking system in fluid communication with and controllably charged and discharged by the locomotive braking system, an apparatus for determining whether an overcharged condition exists following an overcharge process whereby the pressurized braking system is charged to a predetermined overcharge pressure, wherein said control apparatus comprises:

means for monitoring the locomotive braking system pressure;

means responsive to said monitoring means for determining when the locomotive braking system pressure increases to the predetermined overcharge pressure, followed by the initiation of a slow pressure reduction of the locomotive braking system; and means for generating an output signal in response to said means for monitoring and said means for determining, by calculating the preselected value of the locomotive braking system pressure at intervals during the slow pressure reduction, based on a preselected pressure reduction rate, and for generating the output signal if the locomotive braking system pressure is greater than the preselected value for longer than a predetermined time.

9. The apparatus of claim 8 wherein the preselected slow pressure reduction rate is determined by preselected values for the overcharge pressure and the pressure reduction.

10. A control apparatus for use with a brake system of a railway train having a locomotive and at least one car, the locomotive comprising a braking system that is controllably charged and discharged to release and apply brakes of the railway train, each car includes a car braking system in fluid communication with and controllably charged and discharged by the locomotive braking system, an apparatus for determining whether an overcharged condition exists following an overcharge process whereby the pressurized braking system is charged to a predetermined overcharge pressure, wherein said control apparatus comprises:

means for monitoring the locomotive braking system pressure;

means responsive to said monitoring means for determining when the locomotive braking system pressure increases to the predetermined overcharge pressure, followed by the initiation of a slow pressure reduction of the locomotive braking system; and means for activating an alarm in response to said means for monitoring and said means for determining, if the slow pressure reduction does not result in the locomotive braking system pressure reaching a preselected value.

11. A control apparatus for use with a brake system of a railway train having a locomotive and at least one car, the locomotive comprising a braking system that is controllably charged and discharged to release and apply brakes of the railway train, each car includes a car braking system in fluid communication with and controllably charged and discharged by the locomotive braking system, an apparatus for determining whether an overcharged condition exists following an overcharge process whereby the pressurized braking system is charged to a predetermined overcharge pressure, wherein said control apparatus comprises:

means for monitoring the locomotive braking system pressure;

means responsive to said monitoring means for determining when the locomotive braking system pressure increases to the predetermined overcharge pressure, followed by the initiation of a slow pressure reduction of the locomotive braking system; and means for switching the locomotive traction into an idle state in response to said means for monitoring and said means for determining, if the slow pressure reduction does not result in the locomotive braking system pressure reaching a preselected value.

12. A control apparatus for use with a brake system of a railway train having a locomotive and at least one car, the locomotive comprising a braking system that is controllably charged and discharged to release and apply brakes of the railway train, each car includes a car braking system in fluid communication with and controllably charged and discharged by the locomotive braking system, an apparatus for determining whether an overcharged condition exists following an overcharge process whereby the pressurized braking system is charged to a predetermined overcharge pressure, wherein said control apparatus comprises:

means for monitoring the locomotive braking system pressure;

means responsive to said monitoring means for determining when the locomotive braking system pressure increases to the predetermined overcharge pressure, followed by the initiation of a slow pressure reduction of the locomotive braking system; and means for reinitiating the assimilation overcharge process in response to said means for monitoring and said means for determining, if the slow pressure reduction does not result in the locomotive braking system pressure reaching a preselected value.

13. A control apparatus for use with a brake system of a railway train having a locomotive and at least one car, the locomotive comprising a braking system that is controllably charged and discharged to release and apply brakes of the railway train cars, each car includes a car braking system in fluid communication with and controllably charged and discharged by the locomotive braking system, an apparatus for determining whether an overcharged condition exists following an overcharge process whereby the pressurized braking system is charged to a predetermined overcharge pressure, wherein said control apparatus comprises:

a monitor for determining the locomotive braking system pressure;

a processor responsive to said monitor, when the railway train is stopped, for determining when the locomotive braking system pressure increases to the predetermined overcharge pressure, followed by the initiation of a slow pressure reduction of the locomotive braking system; and a controller for generating an output signal in response to said monitor and said processor, if the slow pressure reduction is interrupted by an emergency condition and therefore does not result in the locomotive braking system pressure reaching a preselected value, and therefore the braking system of each railway train car is not charged to the same pressure.

14. A control apparatus for use with a brake system of a railway train having a locomotive and at least one car, the locomotive comprising a braking system that is controllably charged and discharged to release and apply brakes of the railway train cars, each car includes a car braking system in fluid communication with and controllably charged and discharged by the locomotive braking system, an apparatus for determining whether an overcharged condition exists following an overcharge process whereby the pressurized braking system is charged to a predetermined overcharge pressure, wherein said control apparatus comprises:

a monitor for determining the locomotive braking system pressure;

a processor responsive to said monitor for determining when the locomotive braking system pressure increases to the predetermined overcharge pressure, followed by the initiation of a slow pressure reduction of the locomotive braking system; and a controller for calculating the preselected value of the locomotive braking system pressure at intervals during the slow pressure reduction, based on a preselected pressure reduction rate, and for generating the output signal if the locomotive braking system pressure is greater than the preselected value for longer than the predetermined time.

15. The apparatus of claim 14 wherein the preselected pressure reduction rate is determined by preselected values for the overcharge pressure and the duration of the pressure reduction.

16. A control apparatus for use with a brake system of a railway train having a locomotive and at least one car, the locomotive comprising a braking system that is controllably charged and discharged to release and apply brakes of the railway train cars, each car includes a car braking system in fluid communication with and controllably charged and discharged by the locomotive braking system, an apparatus for determining whether an overcharged condition exists following an overcharge process whereby the pressurized braking system is charged to a predetermined overcharge pressure, wherein said control apparatus comprises:

a monitor for determining the locomotive braking system pressure;

a processor responsive to said monitor for determining when the locomotive braking system pressure increases to the predetermined overcharge pressure, followed by the initiation of a slow pressure reduction of the locomotive braking system; and a controller for activating an alarm in response to said monitor and said processor, if the slow pressure reduction does not result in the locomotive braking system pressure reaching a preselected value.

17. A control apparatus for use with a brake system of a railway train having a locomotive and at least one car, the locomotive comprising a braking system that is controllably charged and discharged to release and apply brakes of the railway train cars, each car includes a car braking system in fluid communication with and controllably charged and discharged by the locomotive braking system, an apparatus for determining whether an overcharged condition exists following an overcharge process whereby the pressurized braking system is charged to a predetermined overcharge pressure, wherein said control apparatus comprises:

a monitor for determining the locomotive braking system pressure;

a processor responsive to said monitor for determining when the locomotive braking system pressure increases to the predetermined overcharge pressure, followed by the initiation of a slow pressure reduction of the locomotive braking system; and a controller for switching the locomotive traction into an idle state in response to said monitor and said processor, if the slow pressure reduction does not result in the locomotive braking system pressure reaching a preselected value.

18. A control apparatus for use with a brake system of a railway train having a locomotive and at least one car, the locomotive comprising a braking system that is controllably charged and discharged to release and apply brakes of the railway train cars, each car includes a car braking system in fluid communication with and controllably charged and discharged by the locomotive braking system, an apparatus for determining whether an overcharged condition exists following an overcharge process whereby the pressurized braking system is charged to a predetermined overcharge pressure, wherein said control apparatus comprises:

a monitor for determining the locomotive braking system pressure;

a processor responsive to said monitor for determining when the locomotive braking system pressure increases to the predetermined overcharge pressure, followed by the initiation of a slow pressure reduction of the locomotive braking system; and a controller for reinitiating the assimilation overcharge process in response to said monitor and said processor, if the slow pressure reduction does not result in the locomotive braking system pressure reaching a preselected value.

19. For use with an air brake system of a railway train having a locomotive and at least one car, the locomotive comprising a braking system controllably charged and discharged to release and apply brakes of the railway train cars, each car having a braking system in fluid communication with and controllably charged and discharged by the locomotive braking system, a method for determining whether a train separation condition exists, comprising the steps of:

(a) measuring the locomotive braking system pressure;

(b) measuring the locomotive braking system air flow charging rate;

(c) in response to steps (a) and (b), determining when the rate of decrease of the locomotive braking system pressure exceeds a first predetermined value, while the air flow exceeds a second predetermined value; and (d) generating an output signal when the conditions of step (c) are satisfied.

20. The method of claim 19 wherein the output signal activates an alarm.

21. The method of claim 19 wherein the output signal places the locomotive traction into an idle state.

22. A control apparatus for use with a brake system of a railway train having a locomotive and at least one car, the locomotive comprising a braking system that is controllably charged and discharged to release and apply brakes of the railway train cars, each car comprising a car braking system in fluid communication with and controllably charged and discharged by the locomotive braking system, an apparatus for determining whether a train separation condition exists, said apparatus comprising:

first means for determining the locomotive braking system pressure;

second means for determining the locomotive braking system air flow charging rate; and third means responsive to said first and said second means for determining when the rate of the locomotive braking system pressure decrease exceeds a first predetermined value while the air flow exceeds a second predetermined value and for producing an output signal in response thereto.

23. The apparatus of claim 22 wherein the output signal activates an alarm.

24. The apparatus of claim 22 wherein the output signal switches the locomotive traction into an idle state.

25. A control apparatus for use with a brake system of a railway train having a locomotive and at least one car, the locomotive comprising a braking system that is controllably charged and discharged to release and apply brakes of the railway train cars, each car comprising a car braking system in fluid communication with and controllably charged and discharged by the locomotive braking system, an apparatus for determining whether a train separation condition exists, said control apparatus comprising:

a pressure measuring device for determining the locomotive braking system pressure;

an airflow measuring device for determining the locomotive braking system air flow charging rate; and a processor responsive to said pressure measuring device and said airflow measuring device for producing an output signal when the rate of decrease of the locomotive braking system pressure exceeds a first predetermined value while the airflow exceeds a second predetermined value.

26. The control apparatus of claim 25 wherein the output signal activates an alarm.

27. The control apparatus of claim 25 wherein the output signal switches the locomotive traction into an idle state.

* * * * *